United States Patent
Liu et al.

(10) Patent No.: US 9,767,561 B2
(45) Date of Patent: Sep. 19, 2017

(54) METHOD AND APPARATUS FOR A OPTIMAL SEAM FOR SURROUND VIEW SYNTHESIS

(71) Applicant: Texas Instruments Incorporated, Dallas, TX (US)

(72) Inventors: Yucheng Liu, West Lafayette, IN (US); Buyue Zhang, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/546,957

(22) Filed: Nov. 18, 2014

(65) Prior Publication Data

US 2015/0139568 A1 May 21, 2015

Related U.S. Application Data

(60) Provisional application No. 61/905,625, filed on Nov. 18, 2013.

(51) Int. Cl.
*G06T 7/00* (2017.01)
*G06T 3/00* (2006.01)

(52) U.S. Cl.
CPC .......... *G06T 7/0028* (2013.01); *G06T 3/0012* (2013.01)

(58) Field of Classification Search
CPC ......... G06T 7/0028; G06T 2207/10024; G06T 3/4038; G06T 5/006; G06T 2207/10016; G06T 2207/20221; H04N 9/045; H04N 9/64; H04N 9/735; H04N 2209/046; H04N 9/73; H04N 5/23238; H04N 9/68; B60R 2300/607

See application file for complete search history.

(56) References Cited

U.S. PATENT DOCUMENTS

| | | | | |
|---|---|---|---|---|
| 2007/0236595 | A1* | 10/2007 | Pan | G06T 3/0018 348/335 |
| 2007/0291047 | A1* | 12/2007 | Harville | G06F 3/1446 345/589 |
| 2008/0043113 | A1* | 2/2008 | Ishii | G06T 3/4038 348/218.1 |
| 2009/0175492 | A1* | 7/2009 | Chen | G06K 9/00791 382/100 |
| 2011/0150329 | A1* | 6/2011 | Lepine | G06T 3/4038 382/165 |
| 2011/0234801 | A1* | 9/2011 | Yamada | B60R 1/00 348/148 |
| 2012/0154520 | A1* | 6/2012 | Putraya | G06T 3/4038 348/36 |
| 2013/0155241 | A1* | 6/2013 | Tanuki | B60R 1/00 348/148 |
| 2013/0162830 | A1* | 6/2013 | Mitsuta | B60R 1/00 348/148 |

(Continued)

*Primary Examiner* — Jingge Wu

(74) *Attorney, Agent, or Firm* — Gregory J. Albin; Charles A. Brill; Frank D. Cimino

(57) ABSTRACT

A method, apparatus and a surround view camera system for determining the optimal seam for a surround view camera system. The method includes determining the corrected side view image at bird-eye perspective, generating a cost map for overlapping region, finding a minimum cost seam for each overlapping region, computing weight based on distance to the seam, if blending of the pixel, and blending the pixel, synthesizing composite view, and generating a composite view image.

9 Claims, 3 Drawing Sheets

(56) References Cited

U.S. PATENT DOCUMENTS

| | | | | |
|---|---|---|---|---|
| 2013/0329002 A1* | 12/2013 | Tico | ................. | G06T 3/4038 |
| | | | | 348/36 |
| 2013/0329071 A1* | 12/2013 | Doepke | .............. | H04N 5/23258 |
| | | | | 348/222.1 |
| 2014/0152827 A1* | 6/2014 | Yamamoto | ......... | G06K 9/00791 |
| | | | | 348/148 |
| 2014/0362173 A1* | 12/2014 | Doepke | .............. | H04N 5/23238 |
| | | | | 348/36 |
| 2015/0222858 A1* | 8/2015 | Tanuki | ................. | B60R 1/00 |
| | | | | 348/148 |

* cited by examiner

METHOD AND APPARATUS FOR A OPTIMAL SEAM FOR SURROUND VIEW SYNTHESIS

CROSS REFERENCES TO RELATED APPLICATIONS

This application claims priority from U.S. Provisional Patent Application No. 61/905,625 filed on Nov. 18, 2013, which is hereby incorporated by reference in its entirety.

BACKGROUND OF THE INVENTION

Field of the Invention

Embodiments of the present invention generally relate to a method and apparatus for optimal seam for surround view synthesis.

Description of the Related Art

In a canonical surround view camera system, there is a geometric alignment module that corrects the lens distortion and applies perspective transform to bring all views to a common bird-eye perspective. There is also a photometric alignment module that corrects the brightness and color difference between the views. Selecting a seam that cuts through each view overlapping region, the corrected views are stitched together to generate the composite image. Since the perspective transform is based on the flat assumption of the ground plane, the two views do not coincide on non-planar objects in their overlapping region, as shown in FIG. 3. FIG. 3 is an embodiment of a stitched view with fixed seam. This issue is caused by the cameras positioning, which is different and projects the non-planar objects in different directions.

Therefore, there is a need for a method and/or apparatus for correcting the seam in surround view camera system.

SUMMARY OF THE INVENTION

Embodiments of the present invention relate to a method, apparatus and a surround view camera system for determining the optimal seam for a surround view camera system. The method includes determining the corrected side view image at bird-eye perspective, generating a cost map for overlapping region, finding a minimum cost seam for each overlapping region, computing weight based on distance to the seam, if blending of the pixel, and blending the pixel, synthesizing composite view, and generating a composite view image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
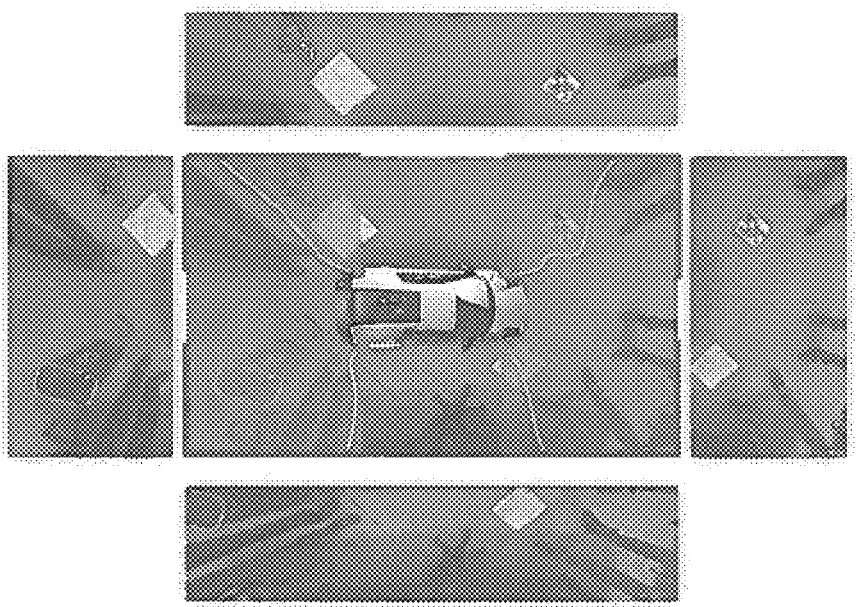
FIG. 2 is an embodiment of valid seams, starting points and ending boundaries.
Figure 3:
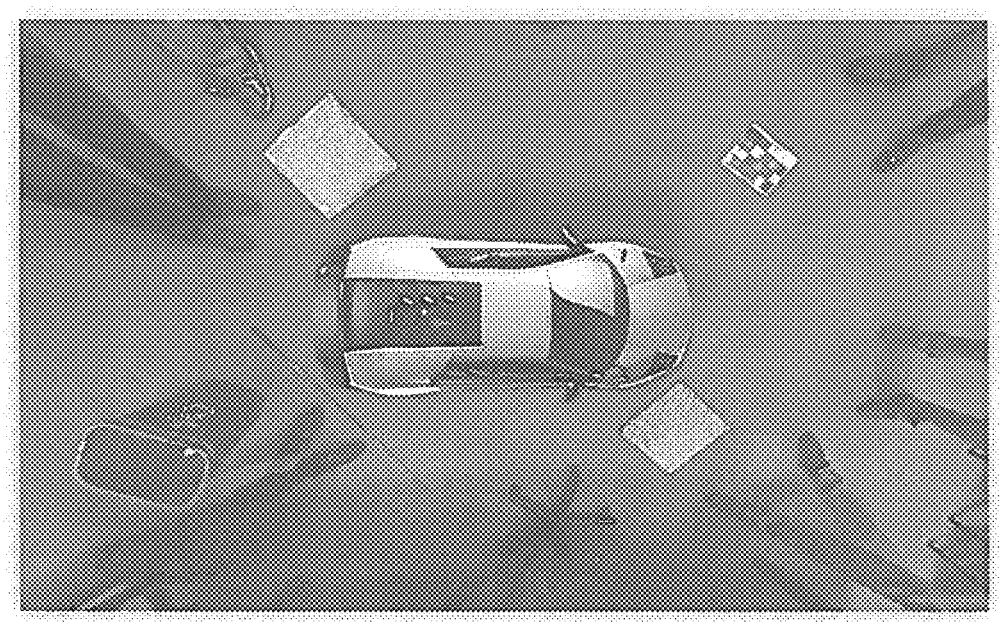
FIG. 3 is an embodiment of a stitched view with fixed seam.

The objective herein is to find a seam that cuts through each view's overlapping region in such a way that difference between two views along the seam is minimized. In one embodiment, the cost map for each overlapping region is generated by computing the absolute difference of local block average between two views. The block-wise operation serves two advantages: 1. Downscale the problem by the size of block; 2. Avoid noisy pixel level comparison and turn to compare local statistics instead. As such, a valid or desirable seam exists in the overlapping region of two views. It is the boundary where two adjacent views meet in the composite image. FIG. 2 is an embodiment of valid seams, starting points and ending boundaries. FIG. 2 is an example of valid seams cutting across the overlapping regions. The starting point of the seam is fixed and marked in green and possible ending boundary is marked in red for each overlapping region.

One practical concern is that shortest path is usually very sensitive to value change in the cost map. To stabilize the shortest path result, especially for real time testing, a constraint is set to where the shortest path can only evolve from the starting point toward the boundary and restrict a backward shift. As an example, the shortest path on the upper right overlapping region usually evolves in three directions: right, up, and upper-right. Such a constraint on the shortest path solves the problem by dynamic programming.

Figure 4:
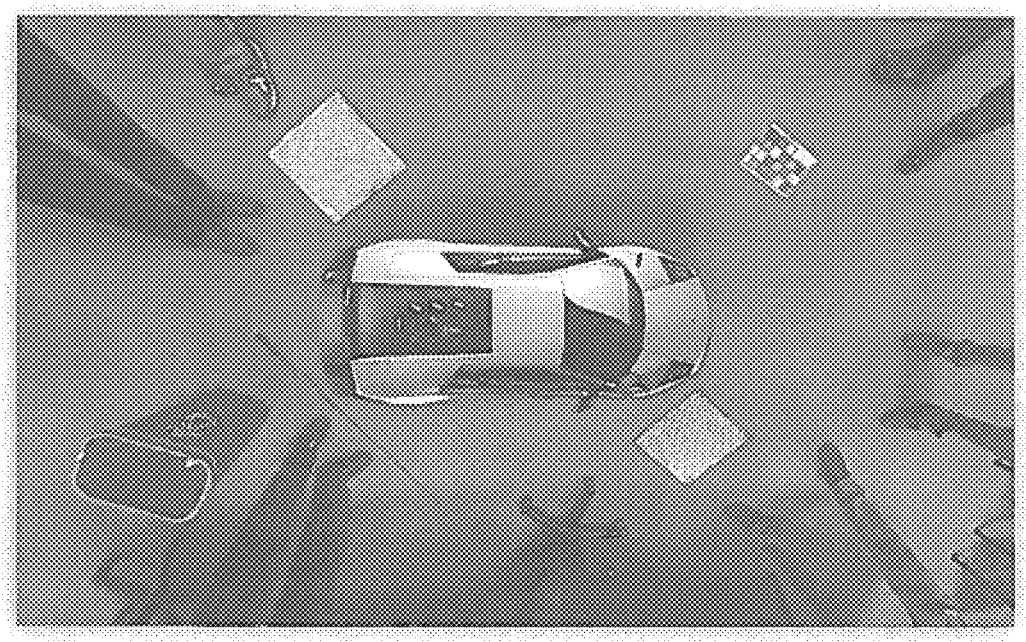
FIG. 4 is an embodiment of a stitched image with optimal seam.
Figure 5:
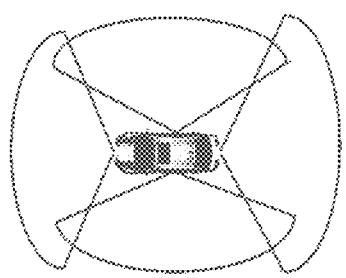
FIG. 5 is an embodiment of a surround view camera system of a vehicle.

FIG. 4 is an embodiment of a stitched image with optimal seam. As shown in FIG. 4, the seam visibility is reduced by selecting the optimal seam and blending pixels from two views near the selected seams. The synthesized pixel value is taken as the weighted average of corresponding pixel values from two views. The blending weight of pixels in one view fade off linearly as the distance to the seam grows on the other side of the seam. The distance of a pixel to the seam is defined as the smallest number of steps needed from a pixel to a seam pixel, where each step takes you to one of the 8 immediate neighbor pixels. The distances of all pixels to the seam in each overlapping region can be computed by going through every pixel once with Breadth First Search. The final composite image is synthesized by selecting pixels from views according to the optimal seam locations with optional blending operation near the optimal seams.

Figure 1:
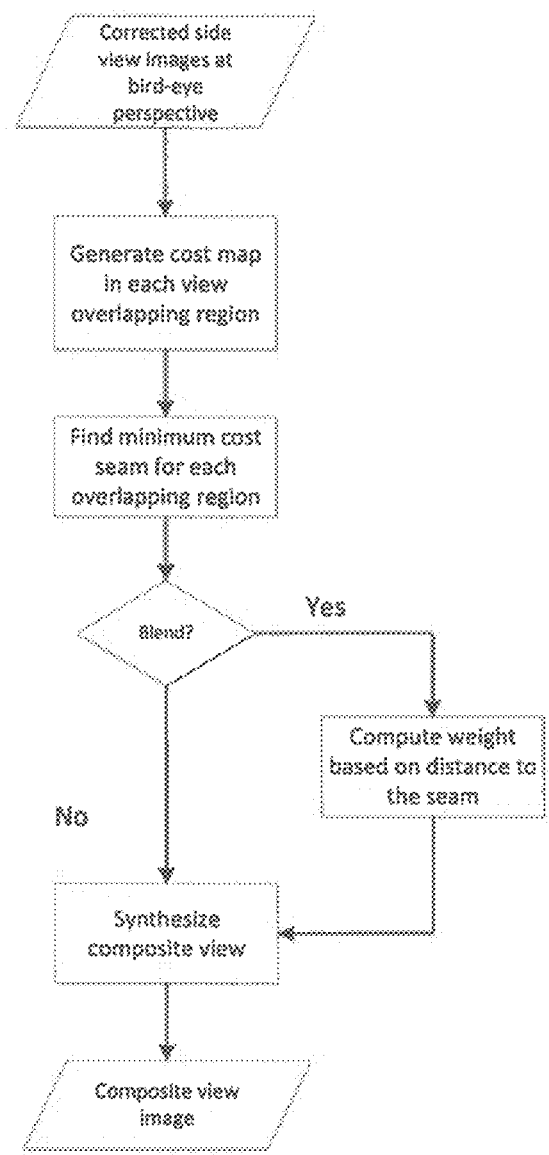
FIG. 1 is an embodiment of a flow diagram for a method of determining the optimal seam for a surround view camera system.

FIG. 1 is an embodiment of a flow diagram for a method of determining the optimal seam for a surround view camera system. The method determines the corrected side view image at bird-eye perspective. Next, the method generates cost map for overlapping regions. The method, then, finds a minimum cost seam for each overlapping region. At such point, the method determines if blending of the pixel is needed. If blending of the pixel is needed, the method computes weight based on distance to the seam. The method synthesizes composite view. Finally, the method generates a composite view image.

While the foregoing is directed to embodiments of the present invention, other and further embodiments of the invention may be devised without departing from the basic scope thereof, and the scope thereof is determined by the claims that follow.

What is claimed is:

1. A method for determining a seam for a surround view camera system, the method comprising:
   determining a corrected side view image at bird's-eye perspective;
   generating a cost map for an overlapping region of a plurality of views;
   finding a minimum cost seam for the overlapping region based on the cost map;
   computing a weight based on a distance from a pixel to the seam, the distance from the pixel to the seam being a smallest number of steps between the pixel and a seam pixel;
   blending the pixel based on the computed weight; and
   generating a composite view image based on the blended pixel.

2. The method of claim 1 further comprising setting a constraint wherein the shortest path for the minimum cost seam evolves from the starting point toward the boundary and is restricted from shifting backward.

3. The method of claim 1, wherein the surround view camera is coupled to a vehicle.

4. A non-transitory computer readable medium comprising instructions that, when executed by a processor, cause the processor to:
   determine a corrected side view image at bird's-eye perspective;
   generate a cost map for an overlapping region of a plurality of views;
   find a minimum cost seam for the overlapping region based on the cost map;
   perform a breadth first search to determine, for each of a plurality of pixels, a distance from the respective pixel to the seam, the distance from the respective pixel to the seam being a smallest number of steps between the respective pixel and a seam pixel;
   compute, for each of the pixels, a weight for the respective pixel based on the distance from the respective pixel to the seam;
   blend each of one or more pixels based the computed weight for the respective pixel; and
   generate a composite view image based on the blended pixels.

5. The non-transitory computer readable medium of claim 4 further comprising setting a constraint wherein the shortest path for the minimum cost seam evolves from the starting point toward the boundary and is restricted from shifting backward.

6. The non-transitory computer readable medium of claim 4, wherein the surround view camera is coupled to a vehicle.

7. A surround view camera system, comprising:
   a memory; and
   a processor configured to:
      determine a corrected side view image at bird's-eye perspective;
      generate a cost map for an overlapping region of a plurality of views;
      find a minimum cost seam for the overlapping region based on the cost map;
      compute a weight based on a distance from a pixel to the seam, the distance from the pixel to the seam being a smallest number of steps between the pixel and a seam pixel;
      blend the pixel based on the computed weight; and
      generate a composite view image based on the blended pixel.

8. The surround view camera system of claim 7 further comprising setting a constraint wherein the shortest path for the minimum cost seam evolves from the starting point toward the boundary and is restricted from shifting backward.

9. The surround view camera system of claim 7, wherein the surround view camera is coupled to a vehicle.

* * * * *